(12) United States Patent
Saito et al.

(10) Patent No.: US 9,656,328 B2
(45) Date of Patent: May 23, 2017

(54) CUTTING TOOL

(75) Inventors: Manabu Saito, Tokyo (JP); Tatsuo Nakahata, Tokyo (JP); Hideharu Takahashi, Tokyo (JP); Junji Tsuchiya, Tokyo (JP); Masao Watanabe, Tokyo (JP); Eiji Hashimoto, Chiba (JP); Hirofumi Higashiwaki, Mie (JP)

(73) Assignees: FUJI JUKOGYO KABUSHIKI KAISHA, Tokyo (JP); MAKOTOLOY CO., LTD., Osaka (JP)

( * ) Notice: Subject to any disclaimer, the term of this patent is extended or adjusted under 35 U.S.C. 154(b) by 598 days.

(21) Appl. No.: 13/431,218

(22) Filed: Mar. 27, 2012

(65) Prior Publication Data
US 2012/0251253 A1    Oct. 4, 2012

(30) Foreign Application Priority Data

Mar. 30, 2011 (JP) ................................. 2011-074017
Nov. 7, 2011 (JP) ................................. 2011-242956

(51) Int. Cl.
*B23B 51/00* (2006.01)

(52) U.S. Cl.
CPC ...... *B23B 51/009* (2013.01); *B23B 2226/275* (2013.01); *B23B 2228/10* (2013.01); *B23B 2251/04* (2013.01); *B23B 2251/14* (2013.01); *Y10T 408/26* (2015.01); *Y10T 408/78* (2015.01); *Y10T 408/89* (2015.01)

(58) Field of Classification Search
CPC ......................... B23B 2228/10; Y10T 408/909
USPC ................................. 408/144, 145, 227, 230
See application file for complete search history.

(56) References Cited

U.S. PATENT DOCUMENTS 1,309,706 A * 7/1919 Taylor ........................... 408/230
1,847,302 A * 3/1932 Emmons ....................... 408/144
1,887,372 A * 11/1932 Emmons ....................... 408/144
(Continued)

FOREIGN PATENT DOCUMENTS

CN       101829800          9/2010
JP       60067003 A *       4/1985
(Continued)

OTHER PUBLICATIONS

Seiji et al., Drill Coated With Hard Carbon Film, pp. 1-20 (English Translation by FLS, Inc.).*
(Continued)

*Primary Examiner* — Sunil K Singh
*Assistant Examiner* — Ryan Rufo
(74) *Attorney, Agent, or Firm* — Smith, Gambrell & Russell, LLP

(57) ABSTRACT

Disclosed is a cutting tool, including: a cutting edge including a coating from a rake face to a flank face, and has a relief angle of not less than 15 degrees, a material of the coating having a higher wear resistance than a base material of the cutting edge, and during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction.

23 Claims, 13 Drawing Sheets

(56) References Cited

U.S. PATENT DOCUMENTS

| | | | |
|---|---|---|---|
| 3,443,459 A * | 5/1969 | Mackey, Jr. et al. | 408/230 |
| 4,583,888 A * | 4/1986 | Mori et al. | 408/59 |
| 5,022,801 A * | 6/1991 | Anthony et al. | 408/144 |
| 5,354,155 A * | 10/1994 | Adams | 408/145 |
| 5,431,072 A * | 7/1995 | Christoffel | 76/115 |
| 5,609,447 A * | 3/1997 | Britzke et al. | 408/230 |
| 6,082,935 A * | 7/2000 | Hori | 407/54 |
| 6,315,504 B1 | 11/2001 | Sekiguchi et al. | |
| 7,575,401 B1 * | 8/2009 | Garrick et al. | 408/145 |
| 8,734,067 B2 | 5/2014 | Saito et al. | |
| 2006/0056929 A1 | 3/2006 | Haenle | 408/199 |
| 2007/0237594 A1 | 10/2007 | Lang et al. | |
| 2008/0138164 A1 * | 6/2008 | Chen et al. | 408/145 |
| 2009/0003943 A1 * | 1/2009 | Pettersson et al. | 407/33 |
| 2010/0158626 A1 * | 6/2010 | Nakahata et al. | 408/230 |
| 2010/0158627 A1 * | 6/2010 | Mir | 408/230 |
| 2010/0166517 A1 * | 7/2010 | Saito et al. | 408/230 |
| 2010/0232899 A1 * | 9/2010 | Saito et al. | 408/227 |
| 2011/0268518 A1 * | 11/2011 | Sampath et al. | 408/59 |
| 2013/0039709 A1 * | 2/2013 | Goh et al. | 408/1 R |

FOREIGN PATENT DOCUMENTS

| | | | | |
|---|---|---|---|---|
| JP | S63-306812 | | 12/1988 | |
| JP | 03-073210 A | * | 3/1991 | B23C 5/18 |
| JP | 6-75612 | | 10/1994 | |
| JP | H07-80715 A | | 3/1995 | |
| JP | H07-047243 | | 5/1995 | |
| JP | 2000052118 A | * | 2/2000 | |
| JP | 2001-225216 A | | 8/2001 | |
| JP | 2001341018 A | * | 12/2001 | |
| JP | 2002370107 A | * | 12/2002 | |
| JP | 2004-202592 | | 7/2004 | |
| JP | 2006181705 A | * | 7/2006 | |
| JP | 2008-36759 | | 2/2008 | |
| JP | 2009172708 A | * | 8/2009 | |
| JP | 2010017817 A | * | 1/2010 | |
| JP | 2010058179 A | * | 3/2010 | |
| JP | 2010/214478 | | 9/2010 | |
| WO | 2010/086988 | | 8/2010 | |

OTHER PUBLICATIONS

Extended European Search Report dated Sep. 3, 2013 for EP Publication No. 2505287.

Japanese Office Action mailed Mar. 31, 2015 relative to Japanese Patent Application 2011-242956 (with English translation) 12 pages.

Chinese Office Action mailed May 6, 2015 relative to Chinese Patent Application 201210080684.1 (with English translation), 16 pages.

Komanduri, R. & Desai, J.D. (1983). Tool Materials. In Grayson, M. et al. (eds.), Kirk-Othmer, Encyclopedia of Chemical Technology, Third Edition, vol. 23, (pp. 273-309). USA: John Wiley & Sons, Inc.

European Examination Report mailed Nov. 21, 2016 relative to European Patent Application No. 12161735.1 (6 pages).

* cited by examiner

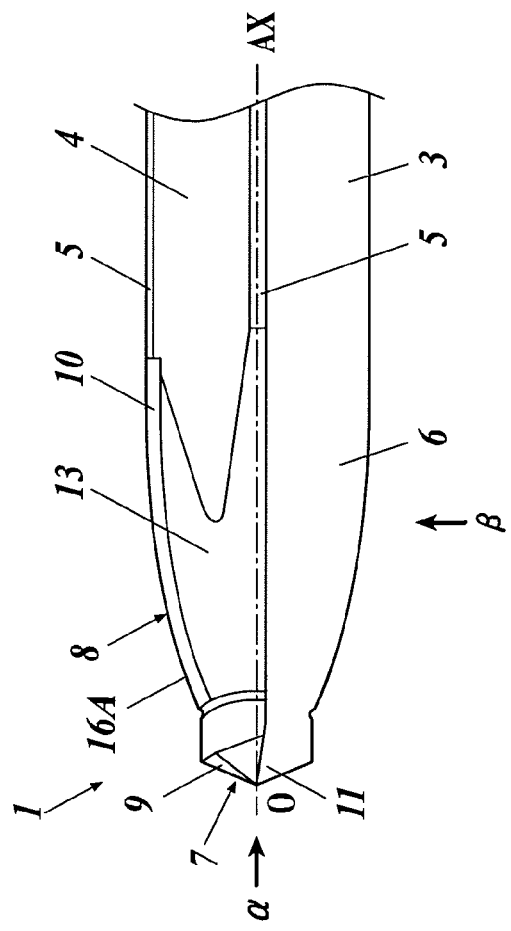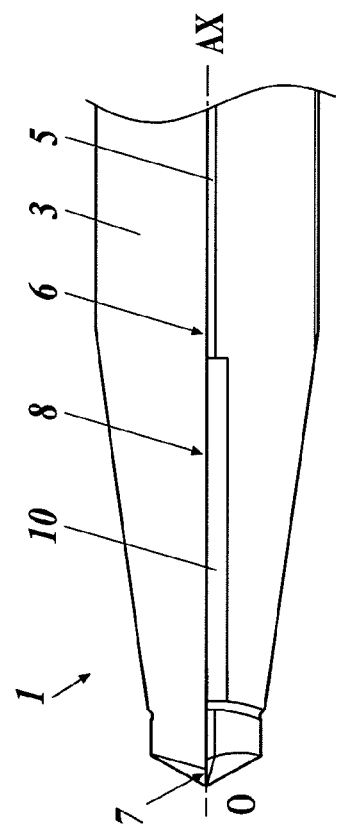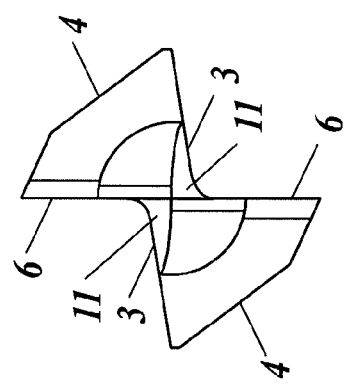

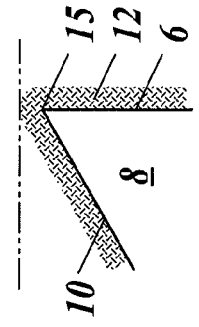
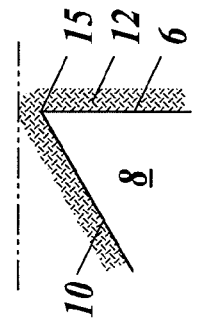
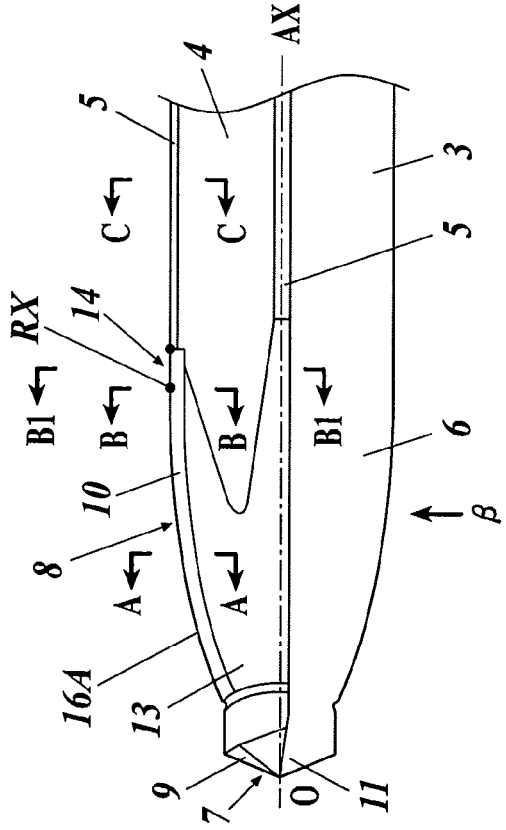
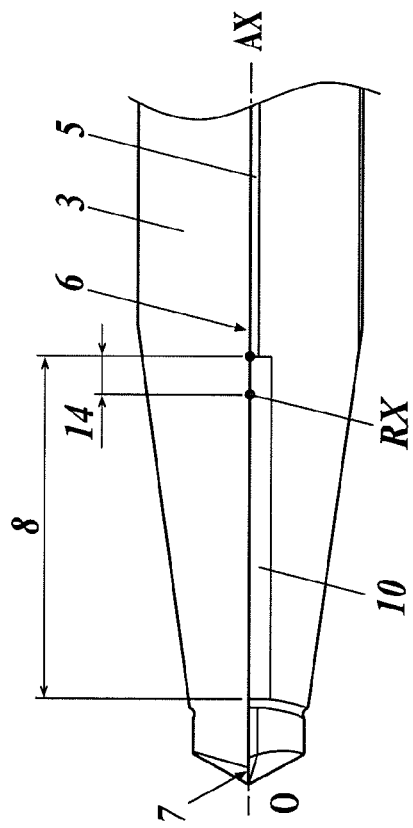

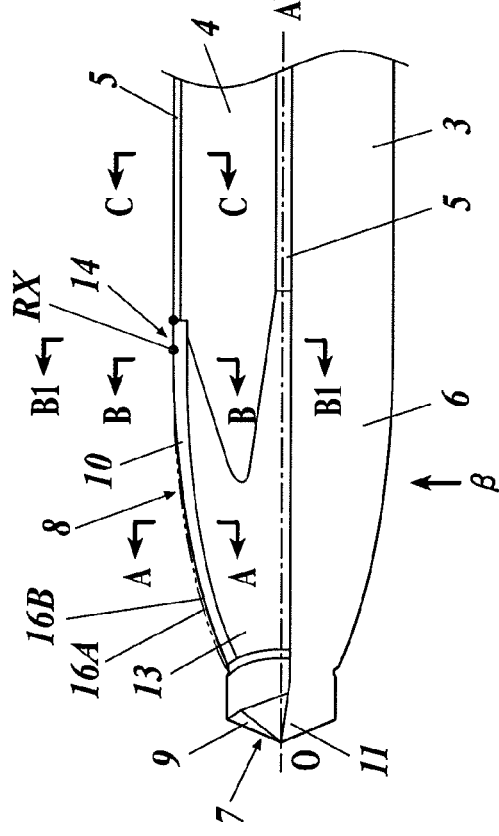

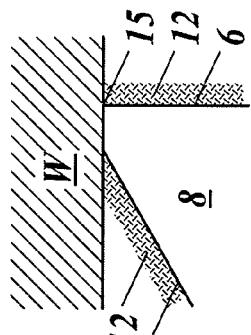
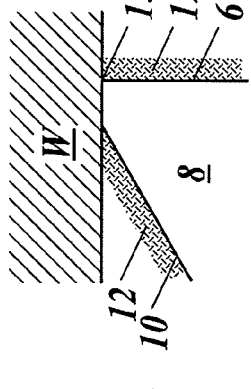
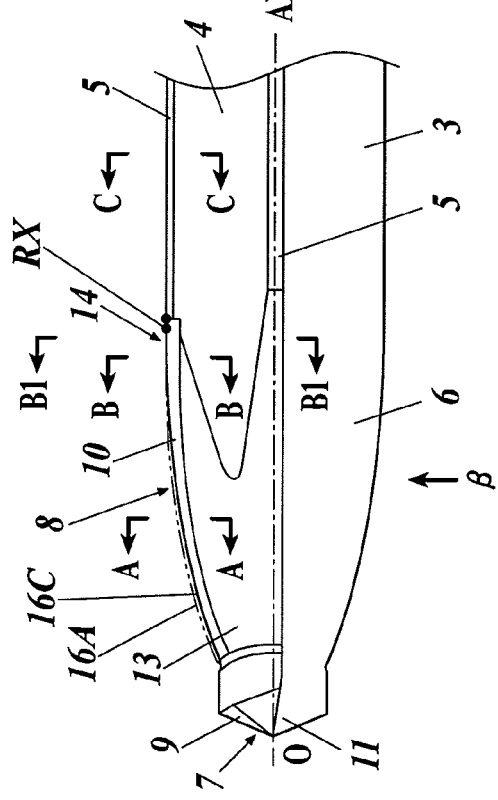
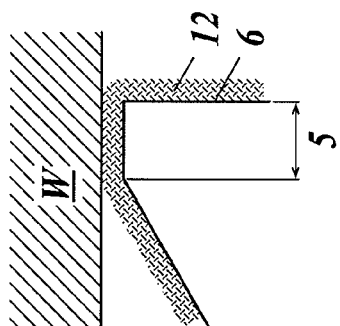
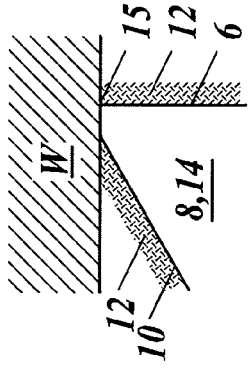
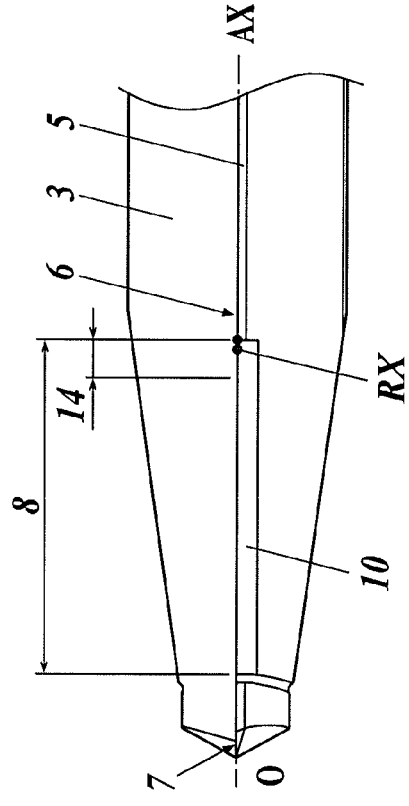

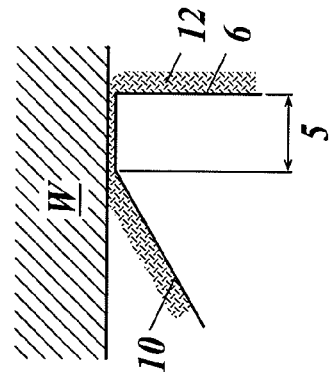
FIG.8A
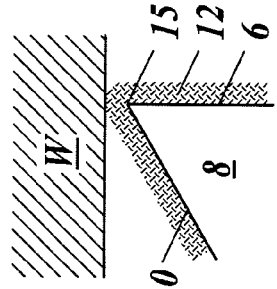
FIG.8B
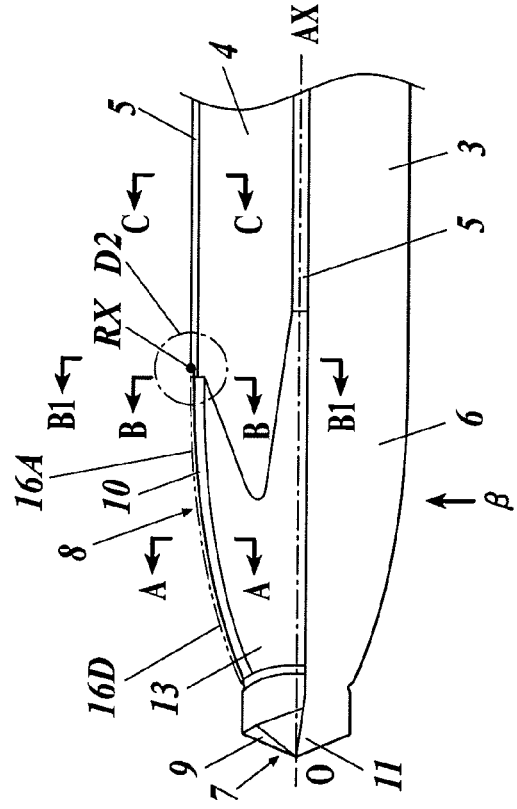
FIG.8C  FIG.8D
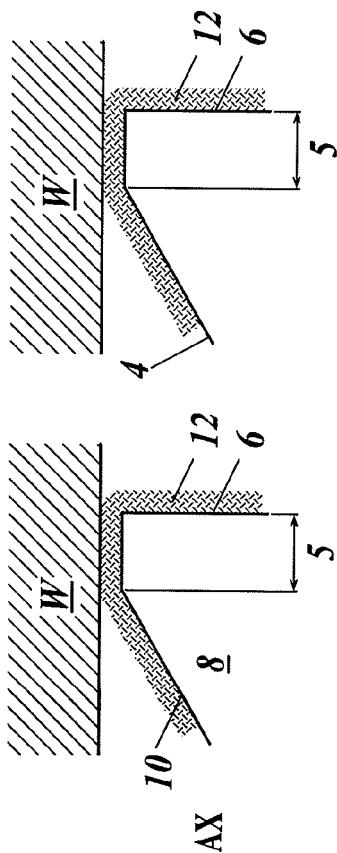
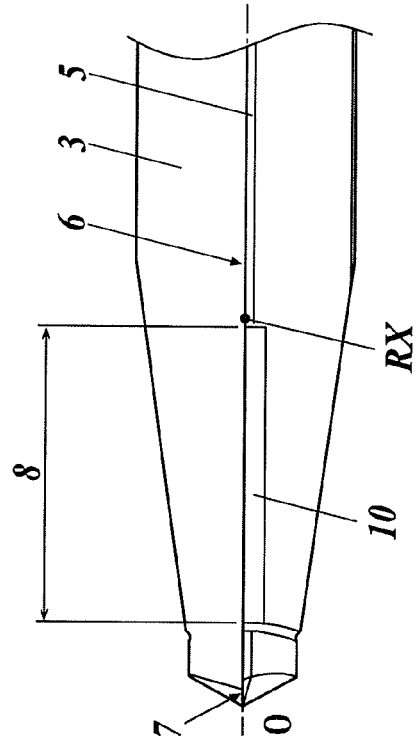
FIG.8E  FIG.8F

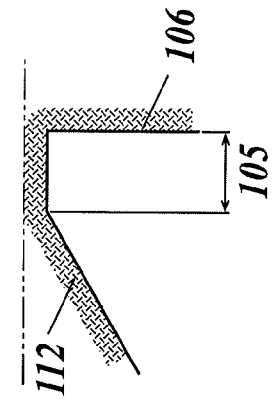 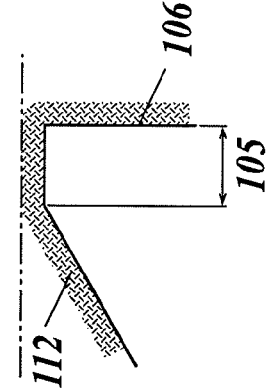 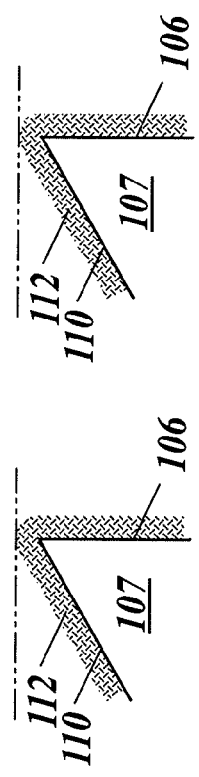
FIG.11A  FIG.11B  FIG.11C  FIG.11D
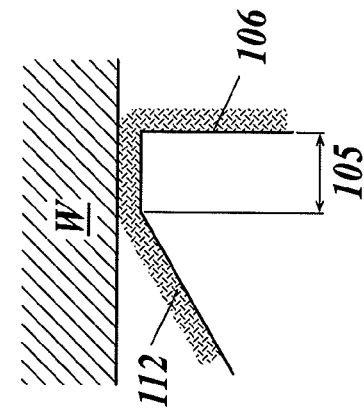 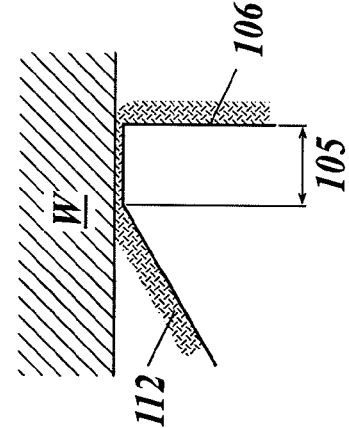 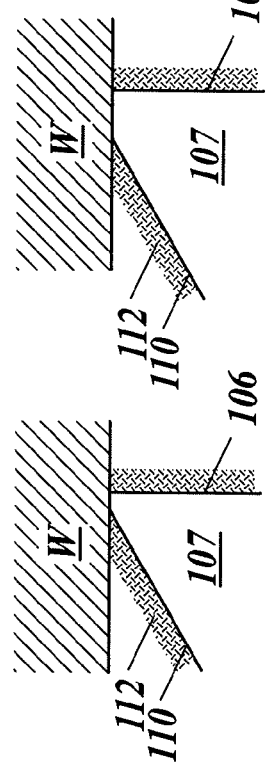
FIG.11E  FIG.11F  FIG.11G  FIG.11H

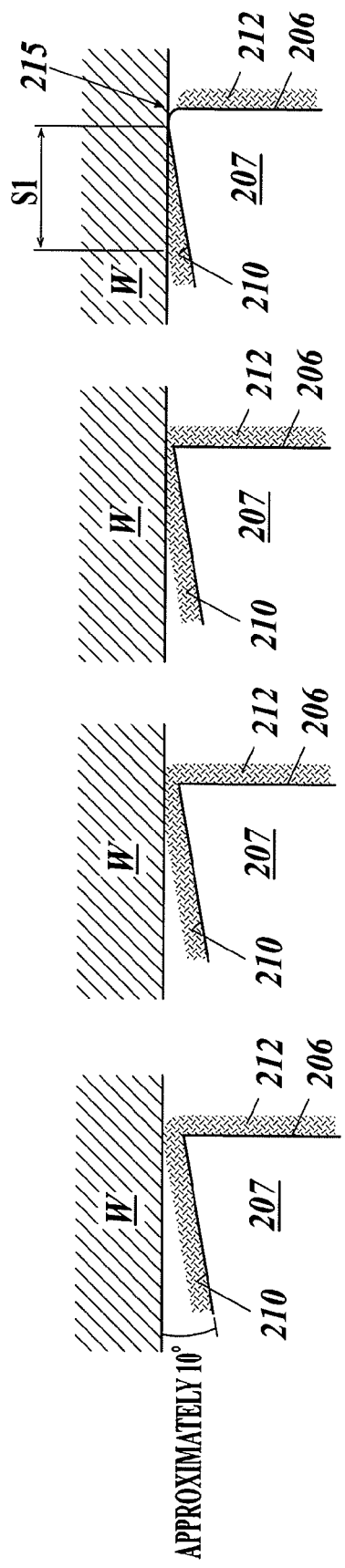

CUTTING TOOL

BACKGROUND OF THE INVENTION

1. Field of the Invention

The present invention relates to a cutting tool with a cutting edge provided with a wear-resistant coating.

2. Background Art

Problems in forming a hole in a carbon fiber reinforced resin composite material using a cutting tool such as a drill bit are delamination, fiber raveling, and occurrence of burr, and the like.

As drill bits which are less likely to cause such problems, double angle drill bits described in Japanese Patent Unexamined Utility Model Publication No. 6-075612 and Japanese Patent Laid-open Publication No. 2008-036759 have been conventionally used.

The tip of a double angle drill bit described in Japanese Patent Unexamined Utility Model Publication No. 6-075612 is coated with diamond in order to increase in resistance to wear.

Herein, a description is given of a conventional typical drill bit provided with wear-resistant coating.

A drill bit shown in FIG. 10A is a typical example of conventional drill bits. In the drill bit shown in FIG. 10A, two grooves 103 are formed between a tip part 101 and a shank part 102. FIG. 10A shows helical grooves by way of example as the grooves 103. In the tip portion 101, two pairs of cutting edges 107 and 107 are formed. On one side of each cutting edge 107, a rake face 106 is formed, and on the other side thereof, a flank face 110 is formed.

The tip part 101 is cross-thinned, and thinnings 111 are continuous to the grooves 103. In each portion hollowed by the thinnings 111 and grooves 103, the rake face 106 is formed. The rake face 106 and flank face 110 meet at the top of the cutting edge 107 with an acute angle therebetween. Each pair of the cutting edges 107 is formed to have a point angle constant between a tool tip point O and a cutting edge maximum radium position RX.

Margins 105 are extended from the cutting edge maximum radium position RX rearward in the direction of an axis AX. In other words, a top ridge line 116A (see FIG. 10C) of each cutting edge 107 is connected to one of the margins 105 at the cutting edge maximum radius position RX. The top ridge line 116A of the cutting edge 17 and the margin 105 are not smoothly continuous to each other and have a relative angle at the cutting edge maximum radius position RX. The margins 105 come to contact with the inner surface of a drilled hole to support the drill bit and are formed in parallel to the inner surface of the drilled hole. On the other hand, since the cutting edges 107 are formed with a point angle constant from the tool tip point O, the angles of the cutting edge 107 and the margin 105 do not match at the cutting edge maximum radius position RX and are discontinuous.

As shown in the cross-sectional views of FIGS. 11A, 11B, 11C, and 11D, it is assumed that the drill bit is provided with a wear-resistant coating 112 from the cutting edge 107 to a margin formed portion where the margin 105 is formed.

In an initial state where the drill bit is not yet used in cutting, the top ridge line 116A of the cutting edge 107 is formed as indicated by solid lines in FIGS. 10B and 10C and is not worn. The states of the cutting edge 107 and wear-resistant coating 112 are shown in FIGS. 11A, 11B, 11C, and 11D.

If this drill bit is used for cutting, the wear-resistant coating 112 is removed by wear due to friction between the drill bit and a work W as shown in FIGS. 11E, 11F, 11G, and 11H. In the cutting edge 107 worn to a certain degree, the base material is exposed as shown in FIGS. 11E and 11F, and the exposed base material has begun to wear. The wear further proceeds. The larger the radius, the higher the speed relative to the work W, and the higher the cutting load. Accordingly, the drill bit is worn more in a cross section A1-A1 which is located at the comparatively backward position shown in FIG. 11F than in a cross section A-A which is located at the comparatively forward position shown in FIG. 11E.

The radius of the drill bit is large also in the margin formed portion shown in FIGS. 11G and 11H. However, the margin 15 does not perform cutting. Moreover, the area of contact between the margin formed portion and the work W is larger by the width of the margin 105, and the frictional load per unit area is smaller. The wear in the margin formed portion therefore does not proceed as much as in the cutting edge 107.

As a result, the cutting edge 107 which has been worn to a certain degree, as shown by a chain double-dashed line in FIGS. 10B and 10C, is hollowed near the cutting edge maximum radium position RX, which is the boundary between the cutting edge 107 and the margin 105, to have the cutting edge top ridge line 116B inflected. In FIG. 10C, Ho indicates an auxiliary line which passes through the cutting edge maximum radius position RX and extends in parallel to a tool central axis AX. Ha indicates an extension line of a cutting edge top ridge line 116A at the cutting edge maximum radius position RX in the initial time. Hb indicates an extension line of a cutting edge top ridge line 116B at the cutting edge maximum radius position RX when the cutting edge 107 is worn to a certain degree. As shown by the extension line Hb, the cutting edge point angle is close to 180 degrees at the cutting edge maximum radius position RX. With the cutting edges having a point angle of 180 degrees, the thinned margin at the outer circumference adversely affects accuracies of the hole diameter and the inner surface of the hole. Accordingly, at a certain time when the cutting edge point angle at the cutting edge maximum radius position RX is approximated to 180 degrees, the cutting performance of the drill bit is significantly reduced, and the drill bit comes to the end of the working life as a cutting tool.

This problem cannot be resolved even with a double angle drill bit having different cutting edge point angles. Moreover, even if the top ridge line of the cutting edge is connected smoothly to the margin, the difference in wear volume between the cutting edge and the margin formed portion does not change. Accordingly, the aforementioned problem cannot be resolved.

The studies by the inventors have confirmed that if the relief angle of the cutting edge is reduced, progress of wear is reduced because the area of contact between the cutting edge and the work W is increased to reduce the frictional load per unit area in a similar manner to the aforementioned margin formed portion. Accordingly, the wear volume of the cutting edge can be close to that of the margin formed portion. However, the following problem occurs. As shown in FIGS. 12A to 12D, if the relief angle of the flank face 210 of the cutting edge 107 is reduced (by about 10 degrees), wear proceeds in the order of FIG. 12A, FIG. 12B, FIG. 12C, and FIG. 12D. With the progress of wear, the area of a contact surface S1 between a part of the wear-resistant coating 212 on the flank face 210 and the work W increases. On the other hand, the area of contact between a part of the wear-resistant coating 212 on the rake face 206 and the work W is always equal to the cross-sectional area of the wear-resistant coating 212 in the layer thickness direction. Accordingly, wear of the wear-resistant coating 212 on the rake face 206 and the base material exposed at a cutting edge tip end 215 remain progressing while the progress of wear of the wear-resistant coating 212 on the flank face 210 is reduced. Accordingly, increasing R at the cutting edge tip end 215 reduces the cutting performance, thus causing the drill bit to come to the end of the working life as a cutting tool.

SUMMARY OF THE INVENTION

The present invention was made in the light of the aforementioned problems in the conventional techniques, and an object of the present invention is to provide a cutting tool in which the resistance to wear is excellent, the reduction in cutting performance due to wear of the cutting edge top is prevented, and the cutting performance can be continued for many works.

According to an aspect of the present invention, there is provided a cutting tool, including:

a cutting edge including a coating from a rake face to a flank face, and has a relief angle of not less than 15 degrees, a material of the coating having a higher wear resistance than a base material of the cutting edge, and during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction.

According to another aspect of the present invention, there is provided a cutting tool, including:

a cutting edge including high-speed tool steel as a base material and is provided with a coating on a flank face to a rake face, and during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction.

BRIEF DESCRIPTION OF THE DRAWINGS

The above and other objects, advantages and features of the present invention will become more fully understood from the detailed description given hereinbelow and the appended drawings and tables which are given by way of illustration only, and thus are not intended as a definition of the limits of the present invention, and wherein:

FIGS. 2A to 2C are views of the drill bit according to the first embodiment of the present invention, FIG. 2A being a side view of a tip part of the drill bit, FIG. 2B being a view on arrow α shown in FIG. 2A, FIG. 2C being a view on arrow β shown in FIG. 2A;

FIGS. 3A, 3B, 3C, 3D, 3E, and 3F are views of the drill bit according to the first embodiment of the present invention, showing the initial state where the drill bit is not yet used for cutting a work, FIG. 3A being a side view of the tip part of the drill bit, FIG. 3B being a view on arrow β shown in FIG. 3A, FIGS. 3C to 3F being cross-sectional schematic views of a cutting edge taken along lines A-A, B-B, B1-B1, and C-C, respectively;

FIGS. 4A, 4B, 4C, 4D, 4E, and 4F are views of the drill bit according to the first embodiment of the present invention, showing an intermediate state that the drill bit is worn by cutting a work, FIG. 4A being an enlarged view of the tip part of the drill bit, FIG. 4B being a view on arrow β shown in FIG. 4A, FIGS. 4C to 4F being cross-sectional schematic views of the cutting edge taken along lines A-A, B-B, B1-B1, and C-C, respectively;

FIGS. 5A, 5B, 5C, 5D, 5E, and 5F are views of the drill bit according to the first embodiment of the present invention, showing a terminal state where the drill bit is further worn by cutting a work, FIG. 5A being an enlarged view of the tip part of the drill bit, FIG. 5B being a view on arrow β shown in FIG. 5A, FIGS. 5C to 5F being cross-sectional schematic views of the cutting edge taken along lines A-A, B-B, B1-B1, and C-C, respectively;

FIGS. 8A, 8B, 8C, 8D, 8E, and 8F are views of the drill bit according to the second embodiment of the present invention, showing the terminal state that the drill bit is further worn by cutting a work, FIG. 8A being an enlarged view of the tip part of the drill bit, FIG. 8B being a view on arrow β shown in FIG. 8A, FIGS. 8C to 8F being cross-sectional schematic views of the cutting edge taken along lines A-A, B-B, B1-B1, and C-C, respectively;

FIGS. 11A, 11B, 11C, and 11D are views of the conventional example, showing the initial state that the drill bit is not yet used for cutting a work, FIGS. 11A, 11B, 11C, and 11D being cross-sectional views of the cutting edge taken along lines A-A, A1-A1, B-B, and C-C shown in FIG. 10B, respectively;

FIGS. 11E, 11F, 11G, and 11H are views of the conventional example, showing the terminal state that the drill bit is worn by cutting a work, FIGS. 11A, 11B, 11C, and 11D being cross-sectional views of the cutting edge taken along lines A-A, A1-A1, B-B, and C-C shown in FIG. 10B, respectively;

FIGS. 12A to 12D are cross-sectional schematic views showing the progress of wear of a cutting edge which is provided with a wear-resistant coating and has a comparatively small relief angle.

PREFERRED EMBODIMENTS OF THE INVENTION

Hereinafter, a description is given of embodiments of the present invention with reference to the drawings. The followings describe the embodiments of the present invention and do not limit the present invention.

First Embodiment

First, a description is given of a first embodiment of the present invention with reference to FIGS. 1A to 5F.

Figure 1:
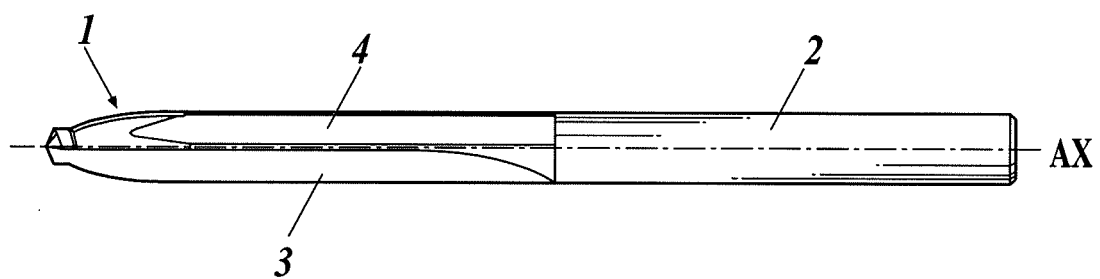
FIG. 1 is an entire side view of a drill bit according to a first embodiment of the present invention.

As shown in FIG. 1, a drill bit of this embodiment includes a tip part 1 and a shank part 2. Between the tip part 1 and shank part 2, two straight grooves 3 are formed.

As shown in FIGS. 2A to 2C, the tip part 1 includes a pair of cutting edges symmetrical to a central axis AX. Each cutting edge includes a primary cutting edge 7 and a secondary cutting edge 8. The primary cutting edge 7 is formed at the front end of a portion protruding from a part including the secondary cutting edge 8 and is separated from the secondary cutting edge 8 in the axial direction. The maximum radius of the primary cutting edge 7 is equal to the minimum of the secondary cutting edge 8. The cutting edge 7 is formed at a point angle constant from the tool tip point O. The top ridge line by the secondary cutting edge 8 is formed by a smooth curve so that the point angle decreases towards the back. The point angle is zero at the cutting edge maximum radius position.

As shown in FIG. 3A, the secondary cutting edge 8 is continuously formed halfway to the tool tip point O so that the point angle thereof continuously increases from 0 degree at a cutting edge maximum radius position RX toward the front in the axial direction AX. The secondary cutting edge 8 may be formed from the cutting edge maximum radius position RX to the tool tip point O in an R shape. In such a case, each cutting edge may be composed of only the secondary cutting edge 8 with the linear cutting edge 7 omitted.

Each cutting edge includes a rake face 6 and a flank face 9, 10, or 13.

The tip part 1 is cross-thinned, and thinnings 11 and 11 are continuous to the straight grooves 3 and 3. The rake faces 6 are formed in portions depressed by the thinnings 11 and 11 and straight groves 3 and 3.

One of the rake faces 6 and the cutting edge second flank face 9 meet at the top of the primary cutting edge 7 with an acute angle. Moreover, another one of the rake faces 6 and the cutting edge second flank face 10 meet at the top of the secondary cutting edge 8 with an acute angle. The cutting edge third flank face 13 is formed so as to be continuous to the trailing end of the cutting edge second flank face 10 in the cutting direction. The internal angle between the cutting edge third and second flank faces 13 and 10 is smaller than 180 degrees.

At the both edges of each portion between the straight grooves 3 and 3, margins 5 and 5 are formed along the straight grooves 3. Between the margins 5 and 5, a planer cut flank face 4 is formed. The margin 5 at the leading edge in the cutting direction is formed so as to be continuous to the rear end of the cutting edge second flank face 10 in the direction of the axis AX. The margin 5 at the trailing edge in the cutting direction and the planer cut flank face 4 are formed so as to be continuous to the rear end of the cutting edge third flank face 13 in the direction of the axis AX. The four margins 5, 5, 5, and 5 come into contact with the inner surface of the drilled hole to support the drill bit.

As shown in FIGS. 3A and 3B, the secondary cutting edge 8 is formed to extend from the cutting edge maximum radius position RX rearward in the direction of the axis AX. A part of the cutting edge extended from the initial cutting edge maximum radius position RX rearward in the direction of the axis AX is referred to as a rear auxiliary edge 14 (not including the initial cutting edge maximum radius position RX).

The rear auxiliary edge 14 has a point angle of zero. As shown in FIGS. 3C, 3D, and 3E, the secondary cutting edge 8 including the rear auxiliary edge 14 has a relief angle. The relief angles of the cutting edges 7 and 8 are set to not less than 15 degrees and not more than 45 degrees in order to provide an appropriate wear property of the flank faces and necessary strength of the cutting edges 7 and 8. More preferably, the relief angles of the cutting edges 7 and 8 are set to not less than 20 degrees and not more than 40 degrees.

As shown in FIGS. 3C and 3D, at the cutting edge maximum radius position RX and before, the secondary cutting edge 8 has a sharp shape in which the rake face 6 and cutting edge second flank face 10 meet at a cutting edge top 15. Similarly, the rear auxiliary edge 14 also may have a sharp shape in which the rake face 6 and cutting edge second flank face 10 meet at the cutting edge top 15. However, the radius of the cutting edge top 15 from the axis AX could be varied due to formation error of the cutting edge second flank face 10. In order to absorb the influence of the formation error on the cutting edge radius, as shown in FIG. 3E, the cutting edge second flask face 10 may be provided with a small margin 17 for the rake face 6. Similar to the margins 5 for supporting the drill bit, the margin 17 for absorbing the error is composed of a face perpendicular to the radial direction around the axis AX, and the width of the margin 17 is set to not more than 0.1 mm. The margins 5 are set to 1.0 mm, for example.

The base material of the cutting edges is made of cemented carbide. As shown in FIGS. 3C, 3D, 3E, and 3F, the wear-resistant coatings 12 are provided on the primary cutting edge 7, secondary cutting edge 8 (including the rear auxiliary edge 14), and margin 5. In the primary and secondary cutting edges 7 and 8, the wear-resistant coating 12 is provided on the rake face 6 and flank face 9 or 10. In the margin 5, the wear-resistant coating 12 is provided on the rake face 6, margin 5, and flank face 4. The wear-resistant coating 12 is provided for the purpose of increasing the resistance to wear and is therefore required to have a wear resistance higher than the base material of the cutting edges. For example, the base material of cemented carbide is coated with diamond as the wear-resistant coating 12.

Next, a description is given of an operation of the drill bit of the aforementioned embodiment which is used for cutting. The work W is a carbon fiber reinforced resin composite.

If the drill bit of this embodiment is used for cutting the work W, the wear-resistant coating 12 and the base material exposed from the wear-resistant coating 12 which are in the initial state of the drill bit not yet used for cutting the work W are worn as shown in FIGS. 4A, 4B, 4C, 4D, 4E, and 4F and further worn as shown in FIGS. 5A, 5B, 5C, 5D, 5E, and 5F.

During cutting of the work W, the edge of the wear-resistant coating 12 on the rake face 6 at the cutting edge top 15 is worn due to friction with the work W as shown in FIG. 3C→FIG. 4C→FIG. 5O and FIG. 3D→FIG. 4D→FIG. 5D. As the wear proceeds inward in the radial direction, the edge of the wear-resistant coating 12 on the flank face 10 at the cutting edge top 15 is removed due to friction with the work W to expose the base material thereunder. The exposed base material is worn due to friction with the work W, and the flank face 10 adjacent to the cutting edge top 15 is retracted inward in the radial direction. In such a manner, due to the friction with the work W, the cutting edge top 15 is worn and is shifted inward in the radial direction while the flank face is retracted inward in the radial direction, thus sharpening the cutting edge. The cutting edge can be therefore kept sharp.

In order to obtain an appropriate wear property of the flank face for such an operation or for keeping the cutting edge sharp, as described above, the relief angle is set to not less than 15 degrees and more preferably, to not less than 20 degrees.

Figure 6:
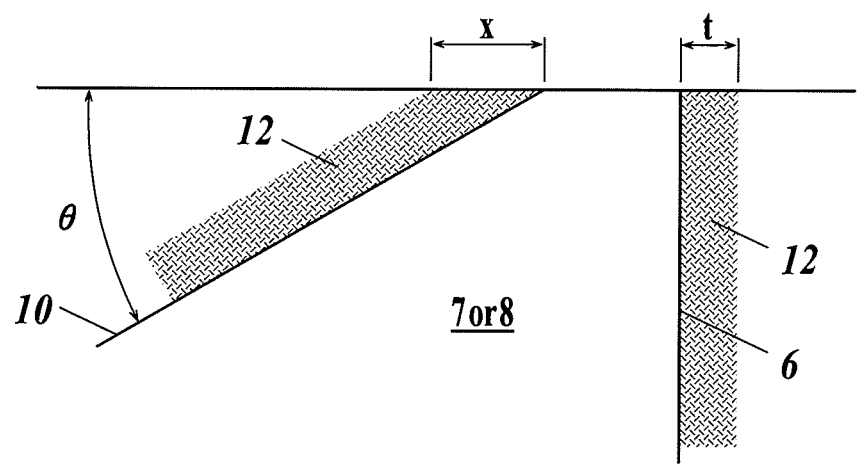
FIG. 6 is a cross-sectional schematic view of the cutting edge which is worn.
Figure 13:
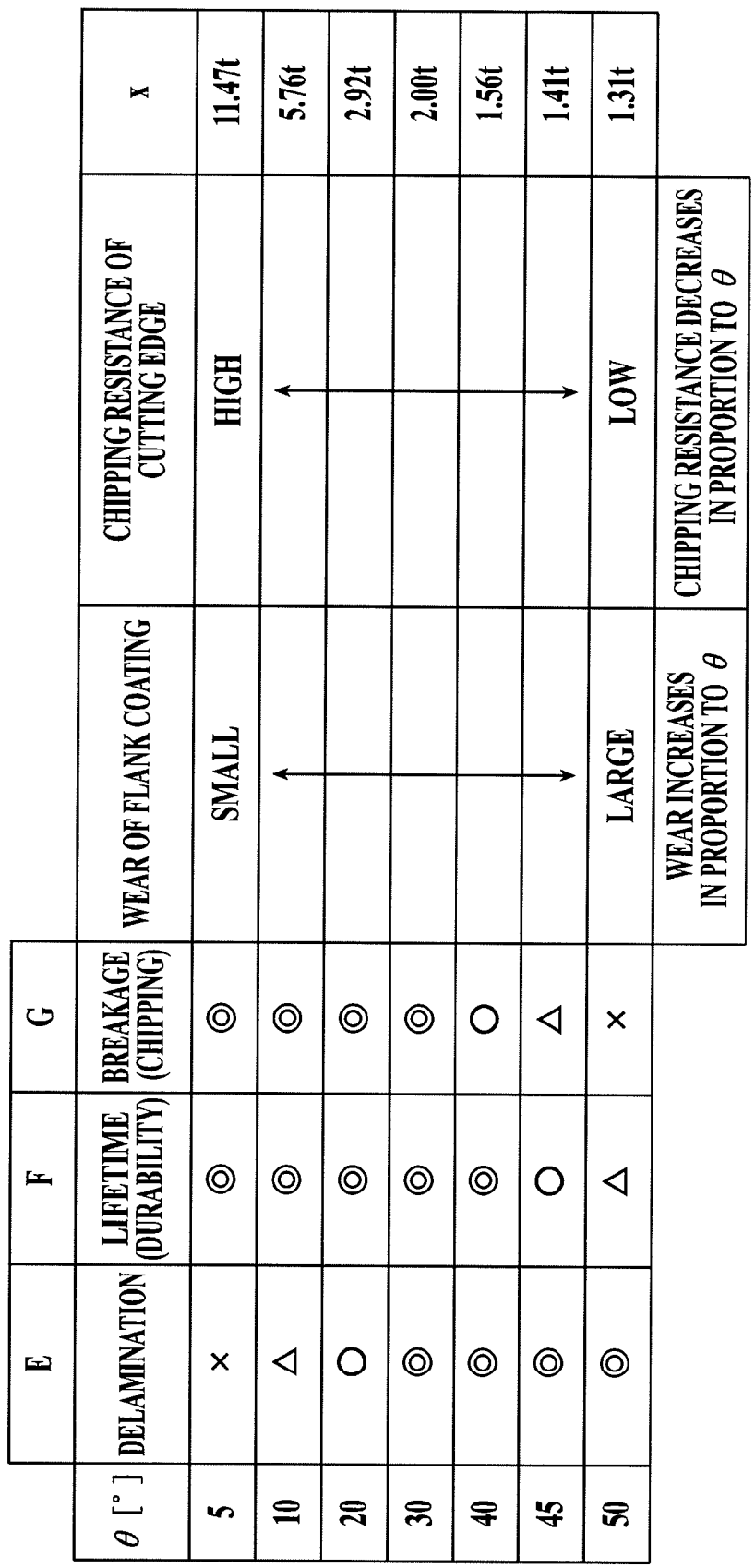
FIG. 13 shows Table 1.

FIG. 6 shows a relief angle θ, a width x of contact between the work W and the wear-resistant coating 12 on the flank face 10, and a thickness t of the wear-resistant coating 12. When the relief angle θ changes to 5, 10, . . . , 45, and 50 degrees, the width x of contact changes as shown in FIG. 13.

As the relief angle θ decreases, the width x of contact increases, and the area of contact between the drill bit and the work W increases. Accordingly, the frictional load per unit area decreases to reduce the progress of wear. As described in FIG. 13, the smaller the relief angle θ, the less likely to be worn a part of the wear-resistant coating 12 on the flank face 10. The larger the relief angle θ, the more likely to be worn the part of the wear-resistant coating 12 on the flank face 10.

This reveals that an increase in wear resistance of the flank face requires an increase in the relief angle θ.

The part of the wear-resistant coating 12 on the flank face 10 is subjected to a force due to friction with the work W in such a direction that the wear-resistant coating 12 is peeled off from the base material. On the other hand, the part of the wear-resistant coating 12 on the rake face 6 is subjected to a force due to friction with the work W in such a direction that the wear-resistant coating 12 is pressed against the base material. In this term, the part of the wear-resistant coating 12 on the flank face 10 tends to be more likely to be worn than the part of the wear-resistant coating 12 on the rake face 6. This tendency is balanced with the improvement in wear property of the flank face 10 due to the increase in relief angle θ. Accordingly, the progress of wear of the wear-resistant coating 12 on the rake face 6 matches the progress of wear thereof on the flank face 10.

On the other hand, if the relief angle θ is increased, the cutting edge becomes thin to have strength reduced and is therefore subject to fracture. As described in FIG. 13, the cutting edge is more resistant to fracture when the relief angle θ is smaller and is less resistant to fracture when the relief angle θ is larger.

In FIG. 13, items E, F, and G are relative evaluations of cutting durability test results.

The idem E is an "occurrence of delamination". ⊚ (double circles), ○ (circles), Δ (triangles), and X (x-marks) indicate the highest, the second highest, the third highest, and the lowest occurrence of delamination, respectively. As the flank face gets closer to the cut surface, the delamination becomes more likely to occur.

The item F is a lifetime. ⊚ (double circles), ○ (circles), and Δ (triangles) indicate the longest lifetime, the second longest lifetime, and the shortest lifetime, respectively. The item G is an occurrence of fracture of the cutting edge. If the relief angle is excessively large, the cutting edge is excessively worn in early time, or the cutting edge is subject to chipping. The drill bit therefore has a short life.

Consequently, in order to obtain an appropriate wear property of the flank face and necessary strength of the cutting edge and in order to reduce the imbalance in progress of wear between the parts of the wear-resistant coating 12 on the flank face 6 and on the rake face 10, the brief angles of the cutting edges 7 and 8 are set to not less than 15 degrees and not more than 45 degrees and more preferably, not less than 20 degrees and not more than 40 degrees In this way, in a preferred embodiment such as that shown in FIG. 6, the cutting edges 7 and 8 are configured such that, upon the base material of the cutting edge being exposed due to wearing of the wear-resistant coating 12 by friction with the work, a ratio of an area of contact x between the coating along the flank face 10 and the work relative to an area of contact t between the coating along the rake face 6 and the work (i.e., a ratio of x:t in FIG. 6) is from about 1.5:1 to about 3:1.

Moreover, the cutting edge maximum radius position RX moves backward in the direction of the axis AX by wear of the cutting edge 8 due to friction with the work W during cutting of the work W as shown in FIGS. 3A and 3B→FIGS. 4A and 4B→FIGS. 5A and 5B.

In the initial state shown in FIGS. 3A and 3B, the cutting edge maximum radius position RX is located on the cross-section B-B. In the state shown FIGS. 4A and 4B where the wear has progressed, the cutting edge maximum radius position RX is located rearward of the cross section B-B. The rear auxiliary edge 14 has already begun to be used in cutting to increase the hole size of the work.

In the state shown in FIGS. 5A and 5B where the wear has further progressed, the cutting edge maximum radius position RX is located rearward of the cross section B1-B1. Half or more of the rear auxiliary edge 14 in length is used for cutting to increase the hole size of the work.

The cutting edge top ridge line 16A in the initial state shown in FIG. 3A is indicated by a solid line in FIG. 3A and is indicated by chain double-dashed lines in FIGS. 4A and 5A. The cutting edge top ridge line in FIG. 4A is indicated by 16B, and the cutting edge top ridge line in FIG. 5A is indicated by 16C.

The cutting edge top is worn by friction with the work W and is shifted inward in the radial direction as shown in the top ridge lines 16A, 16B, and 16C while the cutting edge maximum radius position RX moves backward in the direction of the axis AX. Accordingly, the top ridge line of the cutting edge 8 around the cutting edge maximum radius position RX in the direction of the axis AX can maintain a convex gentle curve. Since the cutting edge maximum radius position RX moves backward in the direction of the axis AX, the curvature of the ridge line of the cutting edge 8 extended in the direction of the axis AX around the cutting edge maximum radius position RX is not increased from the initial state to maintain the convex gentle curve.

According to the drill bit of this embodiment described above, the coating 12 of a material having a higher resistance to wear than the base material of the cutting edge is provided on the cutting edges 7 and 8 from the rake face 6 to the flank face 9 or 10, respectively. Accordingly, it is possible to efficiently cut a work with the sharp cutting edges excellent in wear resistance. Even if the top of the cutting edge is worn by cutting of the work, the flank face is retracted inward in the radial direction to sharpen the cutting edges 7 and 8, and the cutting edges 7 and 8 can be therefore kept sharp. Furthermore, the cutting edge maximum radius position RX moves backward in the direction of the axis AX. Accordingly, the top ridge line of the cutting edge extending in the direction of the axis AX around the cutting edge maximum radius position RX can maintain a convex gentle curve. The drill bit of the embodiment therefore can be continuously used in cutting.

Consequently, the drill bit of this embodiment has an excellent resistance to wear, and the cutting performance thereof can be prevented from decreasing by wear of the cutting edge top and is continued for many works.

Second Embodiment

Figure 7A:
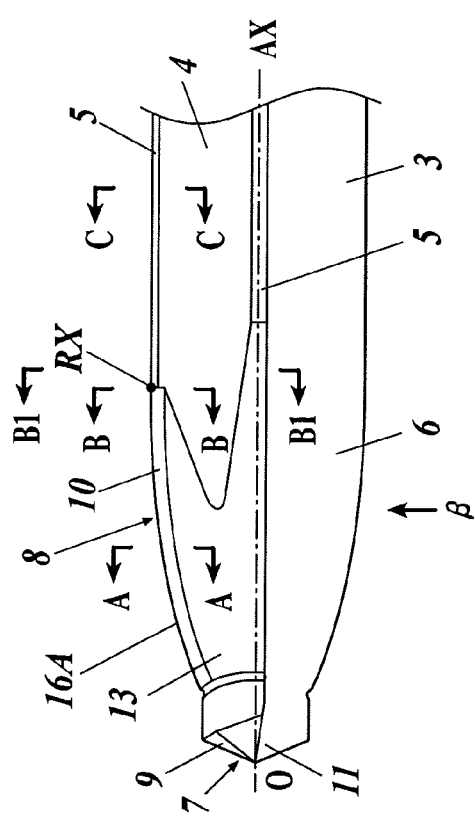
FIGS. 7A, 7B, 7C, 7D, 7E, and 7F are views of a drill bit according to a second embodiment of the present invention, showing an initial state where the drill bit is not yet used for cutting a work, FIG. 7A being a side view of the tip part of the drill bit, FIG. 7B being a view on arrow β shown in FIG. 7A, FIGS. 7C to 7F being cross-sectional schematic views of a cutting edge taken along lines A-A, B-B, B1-B1, and C-C, respectively.
Figure 7B:
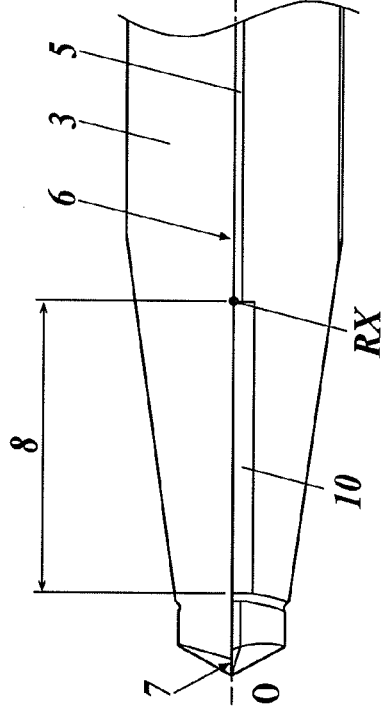
Figure 7C:
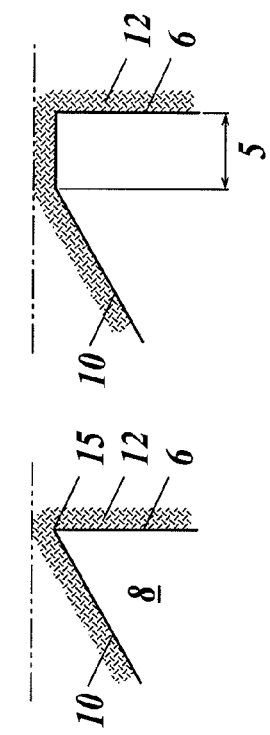
Figure 7D:
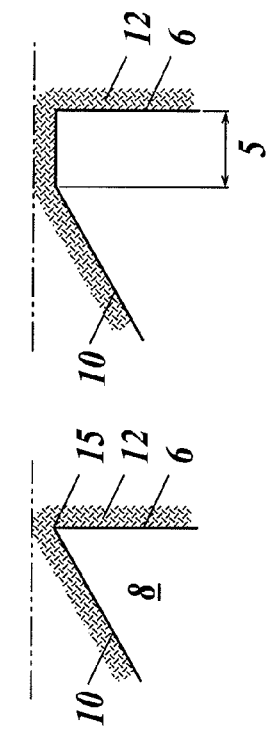
Figure 7E:
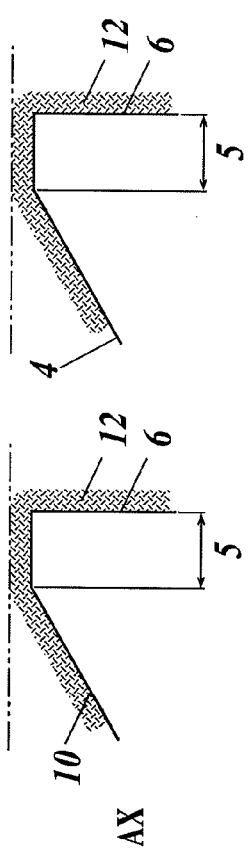
Figure 7F:
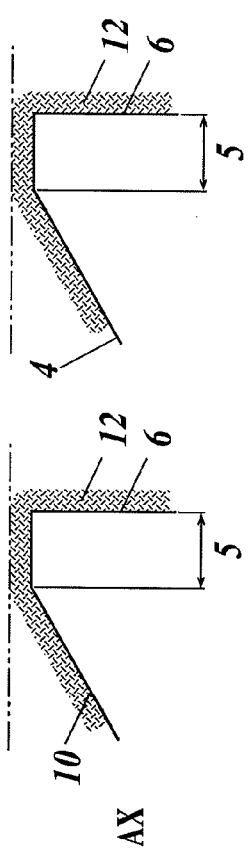

Next, a description is given of a second embodiment of the present invention with reference to FIGS. 7A to 9. This embodiment is a comparative embodiment for showing the effectiveness of the rear auxiliary edge 14 of the first embodiment. The drill bit of this embodiment therefore differs from that of the first embodiment in that the secondary cutting edge 8 does not include the rear auxiliary edge 14 as shown in FIGS. 7A and 7B. Specifically, the secondary cutting edge 8 of this drill bit is not formed beyond the cutting edge maximum radius position RX backward in the direction of the axis AX. The rear end of the secondary edge 8 is located at the cutting edge maximum radius position RX, and at the rearward thereof, the margin 5 is formed. The other shapes are the same as those of the first embodiment.

Figure 9:
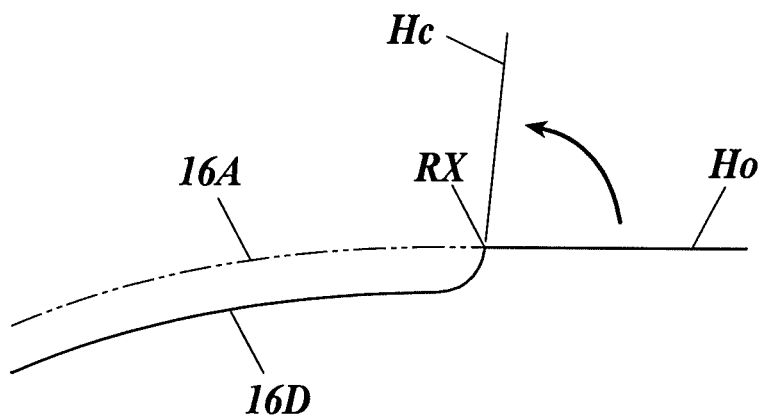
FIG. 9 is a detailed view of a part D2 shown in FIGS. 8A to 8F.
Figure 10A:
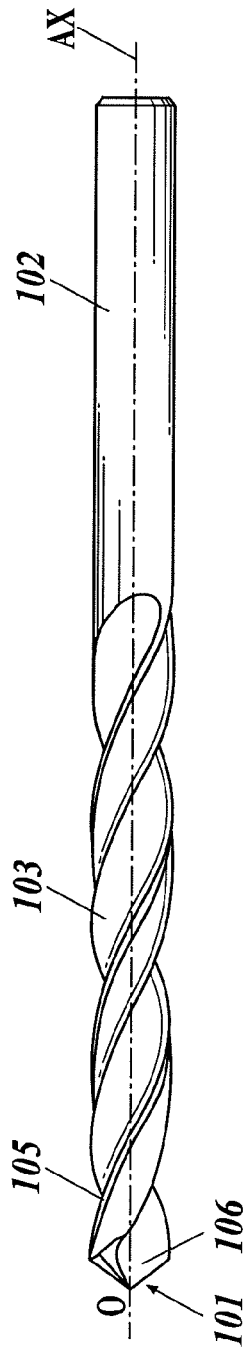
FIGS. 10A to 10C are views of a conventional example, FIG. 10A being an entire side view of the drill bit, FIG. 10B being a side view of the tip part, and FIG. 10C being a detailed view of a part D1 shown in FIG. 10B.
Figure 10C:
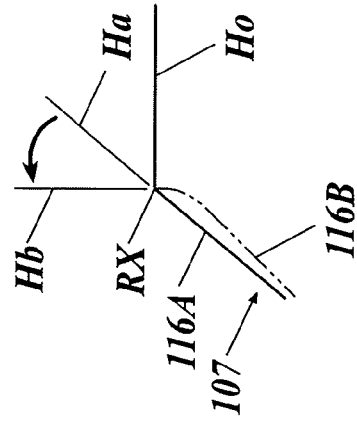
Figure 10B:
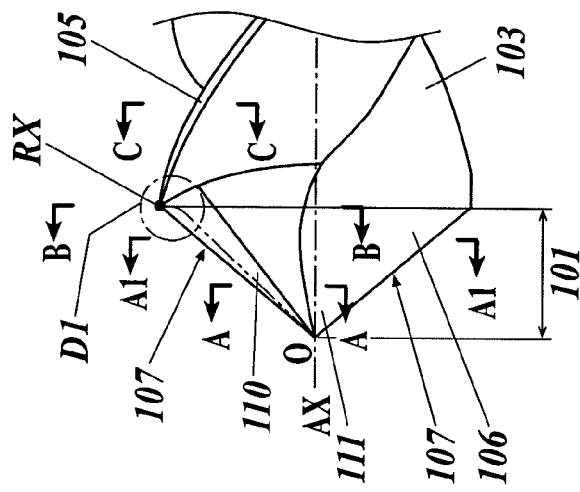

When such a drill bit not including the rear auxiliary edge 14 is used in cutting, the drill bit in the initial state shown in FIGS. 7A to 7F is worn into the state shown in FIGS. 8A to 8F. The cutting edge top ridge line 16A in the initial state changes to a cutting edge top ridge line 16D shown in FIG. 8A by wear. The shape of the cutting edge top ridge line 16 around the cutting edge maximum radius position RX is shown in FIG. 9. In FIG. 9, Ho indicates an auxiliary line which passes through the cutting edge maximum radius position RX and extends in parallel to the tool central axis AX. The auxiliary line Ho corresponds to an extension line of the initial cutting edge top ridge line 16A at the cutting edge maximum radius position RX. Moreover, in FIG. 9, Hc indicates an extension auxiliary extension line of the cutting edge top ridge line 16D at the cutting edge maximum radius position RX after a certain degree of wear.

The margin formed portion shown in FIGS. 8D, 8E, and 8F is not worn as much as the cutting edge 8 because the margin 5 is not used in cutting and the area of contact between the drill bit and the work W is increased by the width of the margin 5 to reduce the frictional load per unit area. Accordingly, as shown in FIGS. 8A and 9, the cutting edge 8 worn to a certain degree is hollowed near the cutting edge maximum radius position RX as a boundary with the margin 5 to provide the cutting edge top ridge line 16D inflected.

As shown by the extension auxiliary line Hc, the cutting edge point angle is close to 180 degrees at the cutting edge maximum radius position RX. Cutting cannot be performed with the cutting edges with a point angle of 180 degrees. Accordingly, at a certain time when the cutting edge point angle is close to 180 degrees, the cutting performance of the drill bit is significantly reduced, and the drill bit comes to the end of the working life as a cutting tool.

The number of works which can be processed by the drill bit of this embodiment shown in FIGS. 8A to 9 by the end of the working life does not reach the number of works which can be processed by the drill bit of the first embodiment shown in FIG. 5A by the end of the working life. In other words, the drill bit of this embodiment not including the rear auxiliary edge 14 comes to the end of the working life earlier than the drill bit of the first embodiment including the rear auxiliary edge 14.

Moreover, since the drill bit of this embodiment can process fewer works by the end of the working life, as shown in FIG. 8C, the wear-resistant coating 12 provided for the cutting edge 8 is not worn as much as that of the first embodiment shown in FIG. 4C or 5C. Accordingly, setting the relief angle to not less than 15 degrees preferably not less than 20 degrees in the second embodiment does not work as effectively as in the first embodiment on provision of an appropriate wear property of the flank face for keeping the cutting edge sharp.

The work for which the cutting tool of the invention can be effectively used is not limited to the above-described material. The cutting tool of the present invention can be effectively applied to a work which causes wear in the cutting edge shown in FIGS. 12A to 12D, thus providing the effect of the present invention. To be specific, the cutting tool of the present invention can be effectively applied to fiber-reinforced resin composites, concrete, and the like. As for viscous metal materials, the process in which the cutting edge becomes out of order is not due to the wearing phenomenon shown in FIGS. 12A to 12D. Accordingly, the aforementioned principle of maintaining the cutting edge by the present invention does not effectively work on such viscous metal materials. The cutting tool of the present invention can be effectively applied to low viscosity metal materials such as cast metal.

It is conventionally known that in order to coat cemented carbide with diamond, the cobalt content of the cemented carbide needs to be not more than 6% (weight concentration). If the cobalt content is more than 6%, the diamond coating peels off.

The principle of maintaining the cutting edge according to the present invention is to reduce the base material of the flank face through wear at cutting. It is therefore preferable that the base material is low in hardness. Accordingly, in the case of applying diamond coating, it is preferable that the cobalt content of the cemented carbide is set to the conventional upper limit, 6%.

To take a full advantage of the principle of maintaining the cutting edge according to the present invention, it is effective in the future to constitute a cutting tool including a cutting edge which has a base material of cemented carbide containing more than 6% of cobalt and is coated with diamond.

Third Embodiment

Next, a description is given of a third embodiment.

To take an advantage of the principle of maintaining the cutting edge according to the present invention, a drill bit including a cutting edge composed of a high-speed tool steel as a base material is also effective. A drill bit of this embodiment is the drill bit of the first embodiment in which the base material is a high-speed tool steel and the wear-resistant coating 12 is composed of one of the followings.

Examples of the high-speed tool steel of the base material are SKH51 and HAP72. SKH51 has a Vickers hardness (HV) of 700, and HAP72 has a Vickers hardness (HV) of 940.

As the wear-resistant coating 12 provided on the rake face and the flank face of each cutting edge, coatings formed on the base material by physical vapor deposition (PVD) or chemical vapor deposition (CVD) can be applied. One of the coatings which can be formed on above-described SKH51 is TiAlN film (BALINIT-SQ made by Oerlikon Balzers, HV=3300, for example, (BALINIT is a registered trademark)), TiCN film (BALINIT-B made by Oerlikon Balzers, HV=3000, for example, (BALINIT is a registered trademark)), or the like.

If a coating has a Vickers hardness of not less than 2500 like the above coatings, the hardness of the coating is higher enough than the hardness of the high-speed tool steel of the base material. Accordingly, such a coating can enhance the wear resistance and can properly implement the aforementioned principle of maintaining the cutting edge according to the present invention through the progress of wear.

The profile of the cutting edge is the same as that of the first embodiment. The profile of the tip of the cutting edge changes due to the progress of wear of the wear-resistant coating 12 and base material in a similar manner to the first embodiment. It is therefore possible to similarly obtain the effect on maintaining the cutting performance for a larger number of works.

To be specific, during cutting of the work W, the edge of the wear-resistant coating 12 on the rake face 6 at the cutting edge top 15 is worn by friction with the work W. As wear progresses inward in the radial direction, the edge of the wear-resistant coating 12 of the flank face 10 at the cutting edge top 15 is removed by friction on the work W to expose the base material thereunder. The exposed base material is further worn by friction with the work W so that the flank face adjacent to the cutting edge top 15 is retracted inward in the radial direction. In such a manner, the cutting edge top 15 is worn and shifted inward in the radial direction by the friction with the work W while the flank surface is retracted inward in the radial direction. The cutting edge is therefore ground and kept sharp.

In order to exert this effect successfully, it is preferable that the relief angle is not less than 15 degrees similarly to the first embodiment.

The high-speed tool steel has a higher toughness than cemented carbide. Accordingly, in this embodiment where the base material is composed of a high-speed tool steel, compared to the case where the base material is cemented carbide, even if the relief angle is increased to reduce the rigidity of the cutting edge, the strength necessary to prevent fracture such as chipping can be more easily provided. Accordingly, it is easy to set the relief angle to not less than 20 degrees, 30 degrees, and even 40 degrees.

The cutting edge top is worn and shifted inward in the radial direction starting from the ridge line 16A to the ridge lines 16B and 16C by friction with the work W while the cutting edge maximum radius position RX moves backward in the direction of the axis AX. This can keep the gentle convex curvature of the point ridge line of the cutting edge 8 extending in the direction of the axis AX around the cutting edge maximum radius position RX. Since the cutting edge maximum radius position RX moves backward in the direction of the axis AX, the point ridge line of the cutting edge 8 extending in the direction of the axis AX around the cutting edge maximum radius position RX has a curvature not increased from the initial state and is maintained in a convex gentle curve.

According to the drill bit of this embodiment, the coating 12 of a material with a higher wear resistance than that of the base member of the cutting edge is provided on the rake faces 6 to the flank faces 9 and 10 in the cutting edges 7 and 8. Accordingly, it is possible to efficiently cut a work with a sharp cutting edge with excellent wear resistance. Moreover, even if the cutting edge top is worn by cutting of the work W, the flank face is retracted inward in the radial direction, and the cutting edges 7 and 8 are therefore ground and kept sharp. Furthermore, since the cutting edge maximum radius position RX moves backward in the direction of the axis AX, the point ridge line of each cutting edge extending in the direction of the axis AX around the cutting edge maximum radius position RX maintains a convex gentle curve. The drill bit of this embodiment can be therefore continuously used in cutting.

Accordingly, in the drill bit of this embodiment, the resistance to wear is excellent, and the cutting performance is prevented from decreasing by wear of the cutting edge top and can be continued for more works.

According to an aspect of the preferred embodiment of the present invention, there is provided a cutting tool, including:

a cutting edge including a coating from a rake face to a flank face, and has a relief angle of not less than 15 degrees, a material of the coating having a higher wear resistance than a base material of the cutting edge, and during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction.

Preferably, while the flank face is retracted inward in the radial direction, the top of the cutting edge is worn by friction with the work and is shifted inward in the radial direction to sharpen the cutting edge and keeps the same sharp.

Preferably, the cutting edge has the top thereof extended rearward from a tool tip point beyond a cutting edge maximum radius position at which a radius of the tool is maximized and a distance from the tool tip point is the shortest.

Preferably, the cutting edge maximum radius position moves rearward in the axis direction by wear of the cutting edge due to friction with the work.

Preferably, while the top of the cutting edge is worn by friction with the work to be shifted inward in the radial direction, the cutting edge maximum radius position moves rearward in the axis direction to maintain a top ridge line of the cutting edge in a gentle convex curve without inflection, the top ridge line extending in the axis direction forward and rearward with respect to the cutting edge maximum radius position.

Preferably, the base material of the cutting edge is cemented carbide, and the coating is a diamond coating.

Preferably, the cutting edge is formed continuously to the tool tip point or halfway to the tool tip point with a point angle of the cutting edge continuously increased from 0 degree at the cutting edge maximum radius position toward a front in the axis direction.

Preferably, the cutting edge has a relief angle of not more than 45 degrees.

Preferably, the cutting edge has a relief angle of not less than 20 degrees.

Preferably, the cutting edge has a relief angle of not more than 40 degrees.

According to another aspect of the preferred embodiment of the present invention, there is provided a cutting tool, including:

a cutting edge including high-speed tool steel as a base material and is provided with a coating on a flank face to a rake face, and during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction.

Preferably, while the top of the cutting edge is worn by friction with the work to be shifted inward in the radial direction, the flank face is retracted inward in the radial direction to sharpen the cutting edge and keep the same sharp.

Preferably, the cutting edge has the top thereof extended rearward from a tool tip point beyond a cutting edge maximum radius position at which a radius of the tool is maximized and a distance from the tool tip point is the shortest.

Preferably, the cutting edge maximum radius position moves rearward in the axis direction by wear of the cutting edge due to friction with the work.

Preferably, while the top of the cutting edge is worn by friction with the work to be shifted inward in the radial direction, the cutting edge maximum radius position moves rearward in the axis direction to maintain a top ridge line of the cutting edge in a gentle convex curve without inflection, the top ridge line extending in the axis direction forward and rearward with respect to the cutting edge maximum radius position.

Preferably, the cutting edge is formed continuously to the tool tip point or halfway to the tool tip point with a point angle of the cutting edge continuously increased from 0 degree at the cutting edge maximum radius position toward a front in the axis direction.

Preferably, the cutting edge has a relief angle of not less than 15 degrees.

Preferably, the coating is a film formed on the base material by physical vapor deposition or chemical vapor deposition.

Preferably, the coating has a Vickers hardness (HV) of not less than 2500.

According to the preferred embodiments of present invention, the flank face and rake face of the cutting edge are coated with a material having higher resistance to wear than the base material of the cutting edge. Accordingly, the drill bit is excellent in resistance to wear and can efficiently cut a work with the sharp cutting edge. Even if the top of the cutting edge is worn by cutting of the work, the flank face is retracted inward in the radial direction to sharpen the cutting edge, so that the cutting edge can be kept sharp. Furthermore, the cutting edge maximum radius position moves backward in the axis direction. Accordingly, the top ridge line of the cutting edge extending in the direction of the axis AX around the cutting edge maximum radius position maintains a convex gentle curve without inflection. The drill bit can be therefore continuously used in cutting.

The present invention has effects on providing excellent resistance to wear, preventing the cutting performance from decreasing by wear of the cutting edge top, and keeping the cutting performance for more works.

The entire disclosure of Japanese Patent Application Nos. 2011-074017 filed on Mar. 30, 2011 and 2011-242956 filed on Nov. 7, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A cutting tool, comprising:
a tip part having a cutting edge including a coating extending continuously from a rake face onto a flank face, a material of the coating having a higher wear resistance than a base material of the cutting edge, wherein the cutting edge has a top ridge line with a convex curve such that a radial distance of the top ridge line from a longitudinal central axis of the tip part increases as the top ridge line extends rearward in a forward-rearward direction of the cutting tool, the cutting edge comprises a forward-most cutting edge maximum radius position, and a rear auxiliary cutting edge that extends rearward from the forward-most cutting edge maximum radius position, the rear auxiliary cutting edge having a point angle of zero, the cutting edge has a flank face relief angle of not less than 15 degrees, and the tip part is configured such that, during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction, and the cutting edge is configured such that, upon the base material of the cutting edge being exposed due to wearing of the coating by friction with the work, a ratio of an area of contact between the coating along the flank face and the work relative to an area of contact between the coating along the rake face and the work is from about 1.5:1 to about 3:1.

2. The cutting tool according to claim 1, wherein the flank face relief angle is one that orients the flank face in such a manner that wear to the cutting edge by friction with the work will retract the flank face inward in the radial direction and shift the top of the cutting edge inward in the radial direction in such a manner to maintain a sharpness of the cutting edge.

3. The cutting tool according to claim 1, wherein the cutting edge is adapted such that, during cutting of a work, the cutting edge is worn by friction with the work over a length that includes the forward-most cutting edge maximum radius position such that there is established a forward-most worn cutting edge maximum radius position that is positioned radially inward and longitudinally rearward relative to the position of the forward-most cutting edge maximum radius position prior to use of the cutting tool.

4. The cutting tool according to claim 1, wherein
the top ridge line extends between points forward and rearward of the forward-most cutting edge maximum radius position, and the convex curve of the top ridge line is without inflection, and the cutting edge is adapted such that when the cutting edge is worn by friction with the work there is established a worn cutting edge having a top ridge line with a continuous convex curve along its length without inflection and a forward-most worn cutting edge maximum radius position that is positioned radially inward and longitudinally rearward relative to the position of the forward-most cutting edge maximum radius position prior to use of the cutting tool.

5. The cutting tool according to claim 1, wherein the base material of the cutting edge is cemented carbide, and the coating is a diamond coating.

6. The cutting tool according to claim 1, wherein the cutting edge extends continuously to a tool tip point or halfway to the tool tip point with a point angle of the cutting edge continuously increasing from 0 degree at the forward-most cutting edge maximum radius position as the cutting edge extends toward the tool tip point.

7. The cutting tool according to claim 1, wherein the cutting edge, including the rear auxiliary cutting edge, has a flank face relief angle of not more than 45 degrees.

8. The cutting tool according to claim 1, wherein the cutting edge, including the rear auxiliary cutting edge, has a flank face relief angle of not less than 20 degrees.

9. The cutting tool according to claim 1, wherein the cutting edge, including the rear auxiliary cutting edge, has a flank face relief angle of not more than 40 degrees.

10. A cutting tool, comprising:
a tip part having a cutting edge including a coating extending continuously from a rake face onto a flank face, a material of the coating having a higher wear resistance than a base material of the cutting edge, wherein
the cutting edge has a top ridge line with a convex curve such that a radial distance of the top ridge line from a longitudinal central axis of the tip part increases as the top ridge line extends rearward in a forward-rearward direction of the cutting tool, and
the cutting tool is configured such that, during cutting of a work, an edge of the coating on the rake face at a top of the cutting edge is worn by friction with the work; with a progress of a wear inward in a radial direction, an edge of the coating on the flank face at the top of the cutting edge is removed by friction with the work to expose the base material thereunder; and the exposed base material is worn by friction with the work to retract the flank face inward in the radial direction,
the cutting edge is adapted, when the top of the cutting edge is worn by friction with the work, to establish a worn cutting edge having a worn top ridge line with a continuous convex curve along its length, while inhibiting the formation of a point of inflection along the worn top ridge line, and a forward-most worn cutting edge maximum radius position that is positioned longitudinally rearward relative to the position of the forward-most cutting edge maximum radius position prior to use of the cutting tool, and
the cutting edge is configured such that, upon the base material of the cutting edge being exposed due to wearing of the coating by friction with the work, a ratio of an area of contact between the coating along the flank face and the work relative to an area of contact between the coating along the rake face and the work is from about 1.5:1 to about 3:1.

11. The cutting tool according to claim 10, wherein the flank face relief angle is one that orients the flank face in such a manner that wear to the cutting edge by friction with the work will shift the top of the cutting edge inward in the radial direction and retract the flank face inward in the radial direction in such a manner to maintain a sharpness of the cutting edge.

12. The cutting tool according to claim 10, wherein the top of the cutting edge extends rearward from a tool tip point beyond a forward-most cutting edge maximum radius position in a forward-rearward direction of the tool.

13. The cutting tool according to claim 12, wherein the cutting edge is adapted such that, during cutting of a work, the cutting edge is worn by friction with the work over a length that includes the forward-most cutting edge maximum radius position.

14. The cutting tool according to claim 12, wherein
the top ridge line, prior to being worn by friction with the work, extends between points forward and rearward of the forward-most cutting edge maximum radius position, and the convex curve of the top ridge line, prior to being worn by friction with the work, is without inflection.

15. The cutting tool according to claim 10, wherein the cutting edge extends continuously to a tool tip point or halfway to the tool tip point with a point angle of the cutting edge continuously increasing from 0 degree at the forward-most cutting edge maximum radius position as the cutting edge extends toward the tool tip point.

16. The cutting tool according to claim 10, wherein the cutting edge has a flank face relief angle of not less than 15 degrees.

17. The cutting tool according to claim 10, wherein the coating is a film formed on the base material by physical vapor deposition or chemical vapor deposition.

18. A cutting tool, comprising:
a tip part having a cutting edge including a coating extending continuously from a rake face onto a flank face, a material of the coating having a higher wear resistance than a base material of the cutting edge, wherein
the cutting edge has a top ridge line with a convex curve such that a radial distance of the top ridge line from a longitudinal central axis of the tip part increases as the top ridge line extends rearward in a forward-rearward direction of the cutting tool,
the cutting edge comprises a forward-most cutting edge maximum radius position, and a rear auxiliary cutting edge that extends rearward from the forward-most cutting edge maximum radius position, the rear auxiliary cutting edge having a point angle of zero,
the flank face of the rear auxiliary cutting edge, at a longitudinally rearward end of the rear auxiliary cutting edge, is continuous with an outer surface of the cutting tool that is longitudinally rearward of the rear auxiliary cutting edge, and
the cutting edge is configured such that, upon the base material of the cutting edge being exposed due to wearing of the coating by friction with the work, a ratio of an area of contact between the coating along the flank face and the work relative to an area of contact between the coating along the rake face and the work is from about 1.5:1 to about 3:1.

19. The cutting tool according to claim 18, wherein the outer surface that is continuous with the flank face of the rear auxiliary cutting edge at a longitudinally rearward end of the rear auxiliary cutting edge is a margin surface of the cutting tool.

20. The cutting tool according to claim 10, wherein the base material of the cutting edge is a high-speed tool steel, and the coating has a Vickers hardness (HV) of not less than 2500.

21. The cutting tool according to claim 1, wherein the cutting edge has a flank face relief angle of not less than 20 degrees and not more than 40 degrees.

22. The cutting tool according to claim 10, wherein the cutting edge has a flank face relief angle of not less than 20 degrees and not more than 40 degrees.

23. The cutting tool according to claim 18, wherein the cutting edge has a flank face relief angle of not less than 20 degrees and not more than 40 degrees.

* * * * *